United States Patent
Mathews et al.

(10) Patent No.: US 10,437,758 B1
(45) Date of Patent: Oct. 8, 2019

(54) MEMORY REQUEST MANAGEMENT SYSTEM

(71) Applicant: Apple Inc., Cupertino, CA (US)

(72) Inventors: Gregory S. Mathews, Saratoga, CA (US); Lakshmi Narasimha Murthy Nukala, Pleasanton, CA (US); Thejasvi Magudilu Vijayaraj, San Jose, CA (US); Sukulpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/024,658

(22) Filed: Jun. 29, 2018

(51) Int. Cl.
- *G06F 13/38* (2006.01)
- *G06F 13/364* (2006.01)
- *G06F 13/18* (2006.01)
- *G06F 13/16* (2006.01)

(52) U.S. Cl.
CPC ........ *G06F 13/364* (2013.01); *G06F 13/1642* (2013.01); *G06F 13/18* (2013.01); *G06F 2213/36* (2013.01)

(58) Field of Classification Search
None
See application file for complete search history.

(56) References Cited

U.S. PATENT DOCUMENTS

| | | | |
|---|---|---|---|
| 6,704,821 B2 | 3/2004 | Scandurra et al. | |
| 6,944,730 B2 | 9/2005 | Lai et al. | |
| 9,411,774 B2 | 8/2016 | Campbell | |
| 9,798,375 B1 | 10/2017 | Becker | |
| 9,971,390 B1 | 5/2018 | Becker | |
| 2006/0277126 A1* | 12/2006 | Rosenbluth | G06F 9/5016 705/35 |
| 2008/0162855 A1 | 7/2008 | Thomas | |
| 2010/0198936 A1 | 8/2010 | Burchard et al. | |
| 2015/0007189 A1 | 1/2015 | De Gruijl et al. | |
| 2018/0063016 A1 | 3/2018 | Gulati et al. | |
| 2018/0275923 A1* | 9/2018 | Earhart | G06F 3/0659 |

OTHER PUBLICATIONS

Becker, "Processor Energy Management System," U.S. Appl. No. 15/272,975, filed Sep. 22, 2016.
Hsiung, et al., "Method and Apparatus for Interrupting Memory Bank Refresh," U.S. Appl. No. 16/012,366, filed Jun. 19, 2018.
Hsiung, et al., "Method and Apparatus for Optimizing Calibrations of a Memory Subsystem," U.S. Appl. No. 16/012,427, filed Jun. 19, 2018.

\* cited by examiner

*Primary Examiner* — Cheng Yuan Tseng
(74) *Attorney, Agent, or Firm* — Meyertons, Hood, Kivlin, Kowert & Goetzel, P.C.

(57) ABSTRACT

A memory request management system may include a memory device and a memory controller. The memory controller may include a read queue, a write queue, an arbitration circuit, a read credit allocation circuit, and a write credit allocation circuit. The read queue and write queue may store corresponding requests from request streams. The arbitration circuit may send requests from the read queue and write queue to the memory device based on locations of addresses indicated by the requests. The read credit allocation circuit may send an indication of an available read credit to a request stream in response to a read request from the request stream being sent from the read queue to the memory device. The write credit allocation circuit may send an indication of an available write credit to a request stream in response to a write request from the request stream being stored at the write queue.

20 Claims, 6 Drawing Sheets

MEMORY REQUEST MANAGEMENT SYSTEM

BACKGROUND

Technical Field

This disclosure relates generally to a memory request management system.

Description of the Related Art

Correct operation of some computer systems is predicated on performance of certain actions within certain time constraints. If the constraints are violated, in some cases, unwanted system behavior may occur. Often, these actions may utilize communications between systems and a memory device to retrieve data, store data, or both. However, features of the memory device may make meeting the constraints more complicated. Further, when multiple systems send, in parallel, requests having constraints to a memory device, managing the requests such that the constraints are not violated may be difficult.

SUMMARY

In various embodiments, a memory request management system is disclosed where memory requests are sent to a memory device based on portions of the memory device addressed by the requests. For example, the system may determine at runtime to service requests out of order during a refresh time of a portion of the memory device. As a result, the system may service more requests, as opposed to a system that services requests in order of receipt or based on priority.

In various embodiments, a memory request management system is disclosed where read credits and write credits are provided to request streams. The request streams may provide read requests corresponding to the read credits and write requests corresponding to the write credits. As a result, the memory request management system may prevent a request stream from oversaturating the memory device. Additionally, in some cases, the requests and the credits may correspond to various priority levels (e.g., real-time, low latency traffic, or bulk). Accordingly, the memory management system may restrict requests in such a way that timing constraints of various requests may be satisfied.

Figure 1:
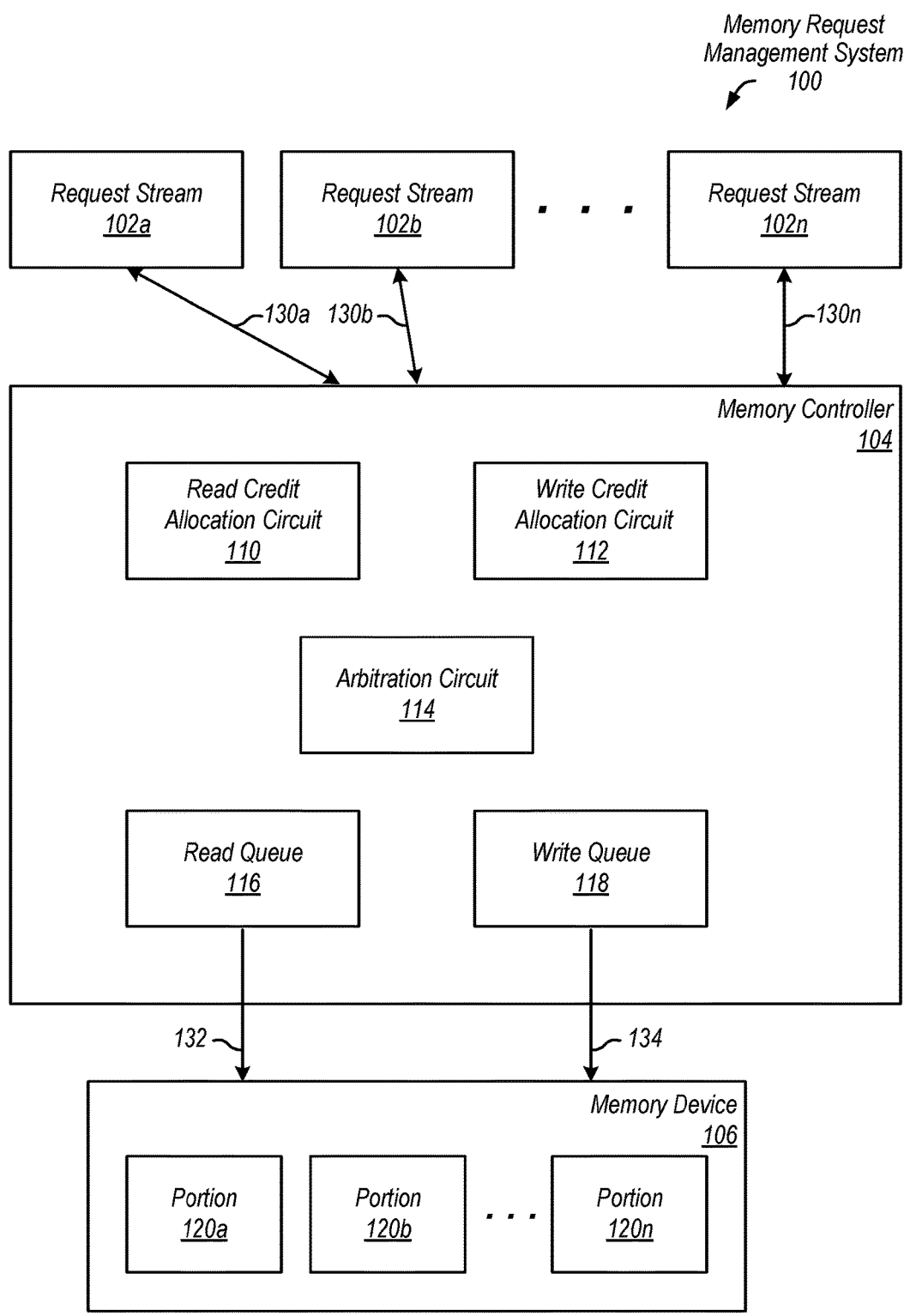
FIG. 1 is a block diagram illustrating one exemplary embodiment of a memory request management system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a memory device that includes three portions, the terms "first portion" and "second portion" can be used to refer to any two of the three portions, and not, for example, just logical portions 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

In some computer systems, multiple request streams may access a single memory system. However, fairly scheduling those request streams may be difficult, as each stream may have differing attributes (e.g., requests having different priority levels, different timing constraints, or different amounts of traffic). Additionally, some memory systems may include memory devices (e.g., DRAM devices) that are designed such that performing grouped read operations and grouped write operations is more efficient than alternating read and write operations. Further, operations targeting multiple pages of different banks may be performed more efficiently than operations targeting multiple pages of a single bank.

A memory request management system is described where a memory controller may receive traffic from multiple request streams. The memory controller may separate the traffic into read requests and write requests and may store the requests in a read queue and a write queue. Accordingly, the memory controller may separately send read requests and write requests to a memory system. Further the memory controller may send requests to the memory system such that at least some delays due to refresh times of the memory system are prevented. In some embodiments, the memory controller may also send requests based on priority levels of the requests.

Additionally, the memory request management system may manage bandwidth of the request streams using read credits and write credits. In response to a read request from a request stream, the memory controller may store the read request in a read queue and identify a read credit of the request stream as being in use. An arbitration circuit, based on read addresses of other entries from the request stream in the read queue, may schedule the read request for a read operation. When the read request is sent to the memory, the memory controller may indicate to the request stream that the read credit is available. In response to a write request from the request stream, the memory controller may store the write request in a write queue. In some embodiments, because the memory controller does not need to return data, the memory controller may return the write credit as soon as the write request has been received.

As used herein, "computing devices" is an open-ended term used to refer to a variety of types of devices. In particular, "computing devices" refers to any device that is configured to perform an operation with respect to data stored at a memory system. As discussed herein, "computing devices" refers to at least one of instruction-based processing devices (e.g., instruction set processors) or other devices (e.g., state machines, hard-wired logic, microcode, etc.). The "computing devices" may be connected to other devices described herein by any method known in the art including, for example, being integrated into a same device, one or more local connections, one or more network connections, etc.

As described herein, "real-time" is an open-ended term used to refer to a variety of devices and situations. "Real-time" may refer to a device that performs operations at or as near to immediacy as permitted by device operating parameters. "Real-time" is used not as an expression of necessity, but as a description of general behavior of the device. In particular, "real-time" may refer to situations where intended operation of the device is based on a time constraint. The device failing to satisfy the time constraint may not, in some cases, result in failure of the device, but failure may be likely. As used herein, "real-time" is expressly intended to include "near real-time," as is known in the art.

Turning now to FIG. 1, a simplified block diagram illustrating one embodiment of a memory request management system 100 is shown. In the illustrated embodiment, memory request management system 100 includes request streams 102a-n, memory controller 104, and memory device 106. Memory controller 104 includes read credit allocation circuit 110, write credit allocation circuit 112, arbitration circuit 114, read queue 116, and write queue 118. Memory device 106 includes portions 120a-n. However, in other embodiments, other structural arrangements (e.g., additional circuits, fewer circuits, more inputs to depicted circuits, or fewer inputs to depicted circuits) are contemplated. For example, in some embodiments, request streams 102a-n may not be part of memory request management system 100 (e.g., because request streams 102a-n are separate devices external to memory request management system 100). As another example, in some embodiments, read credit allocation circuit 110, write credit allocation circuit 112, or both, may be separate from memory controller 104.

Request streams 102a-n may send corresponding traffic 130a-n (e.g., read requests and write requests) to memory controller 104. In various embodiments, request streams 102a-n may be computing devices of memory request management system 100, computing devices separate from memory request management system 100, virtual machines, or virtual channels. Memory controller 104 may receive traffic 130a-n including requests from request streams 102a-n and, depending on the type of request received (e.g., read request or write request), store the requests in read queue 116 or write queue 118. Arbitration circuit 114 may identify an entry from read queue 116 and send corresponding information from read queue 116 to memory device 106 as read request 132. Similarly, arbitration circuit 114 may identify an entry from write queue 118 and send corresponding information from write queue 118 to memory device 106 as write request 134. Memory controller 104 may receive read results from memory device 106 and send the results to the corresponding request stream as traffic 130a-n.

In various embodiments, after a read operation is performed, memory device 106 may complete another read operation more quickly, as compared to a write operation (e.g., because various busses may be used differently when performing read operations, as compared to write operations). Similarly, in some embodiments, after a write operation is performed, memory device 106 may perform another write operation more quickly, as compared to a read operation. Accordingly, in some embodiments, arbitration circuit 114 may cause read requests to be sent sequentially from memory controller 104 to memory device 106 followed by write requests within a particular window of time, or vice versa, as opposed to, for example, sending read requests and write requests as those requests are received. In various embodiments, arbitration circuit 114 may track the requests such that some errors resulting from requests that address a same location within memory device 106 (e.g., a write request followed by a read request) being performed out of order are prevented.

Arbitration circuit 114 may, in some cases, to send requests from queues 116 and 118 out of order based on locations of corresponding addresses within memory device 106. Portions 120a-n of memory device 106 may include multiple respective pages. In some cases, these pages may be referred to as rows. In response to a request, a corresponding page within the addressed portion may be accessed. Memory device 106 may take time to refresh the addressed portion after a request. On the other hand, memory device 106 may access another location within the corresponding page without refreshing the addressed portion. Accordingly, it may be desirable to for arbitration circuit 114 to send multiple requests that address a same page of a portion (e.g., portion 120b) sequentially. Further, it may be desirable to send a request addressing a different portion (e.g., addressing portion 120a) than a previous request (e.g., addressing portion 120b) rather than sending a request that addresses a different page of a same portion (e.g., addressing portion 120b) and waiting for the portion to refresh. Accordingly, in some embodiments, requests may be sent out of order. In various embodiments, reordered requests may be from a single request stream. As a result, arbitration circuit 114 may control rates at which requests from request streams 102a-n are sent to memory device 106. However, in some embodiments, arbitration circuit 114 may select between write requests received from multiple request streams to, in cases where a pattern of requests results in waiting for refresh operations, use memory device 106 more efficiently despite the refresh operations. In the illustrated embodiment, memory device 106 may be a dynamic random-access memory (DRAM) device. However, the operations described above may be used in other memory devices involving refresh times (e.g., a system including multiple disc drives).

In the illustrated embodiment, request streams 102a-n may send differing numbers of requests or requests having differing priority levels to memory controller 104. Memory controller 104 may assign credits to the request streams to reduce errors resulting from request streams unfairly over-utilizing memory device 106 or request streams 102a-n sending more requests than can be stored by read queue 116 and/or write queue 118. In particular, as further described below with reference to FIGS. 2A and 2B, read credit allocation circuit 110 may allocate read credits to request streams 102a-n. Similarly, write credit allocation circuit 112 may allocate write credits to request streams 102a-n. In various embodiments, request streams 102a-n may receive the same amounts of read credits and write credits. Alternatively, request streams 102a-n may receive different amounts of credits. For example, request streams 102a and 102n may each receive 25% of available read credits and request stream 102b may receive the remaining 50%. Additionally, credit proportions may differ between read credits and write credits. To continue the above example, request stream 102a may receive 20% of available write credits, and request streams 102b and 102n may each receive 40% of available write credits. In some embodiments, the allocation of credits may be performed based on requests for bandwidth received from request streams 102a-n. In some cases, as further described with reference to FIGS. 2A and 2B, fewer than all available credits may be allocated. For example, a portion of the credits may be allocated to a shared pool of available credits.

Requests may be sent by request streams 102a-n in response to receiving indications of available credits. For example, read credit allocation circuit 110 may determine that request stream 102b has an available read credit. An indication of the available read credit may be sent to request stream 102b via traffic 130b. In response to the indication of the available read credit, request stream 102b may send a read request to memory controller 104 via traffic 130b.

In the illustrated embodiment, read credit allocation circuit 110 may send an indication of an available read credit to a request stream in response to a previous read request from that request stream being sent from read queue 116 to memory device 106. The indication of the available read credit may be sent with the resulting data from the previous read request or prior to memory controller 104 receiving the resulting data. In some embodiments, because request streams 102a-n do not receive an indication of completion of a write request, write credits may be distributed differently, as compared to read requests. Accordingly, in the illustrated embodiment, memory controller 104 may send an indication of an available write credit in response to receiving the write request. Further, in some cases, indications of available read credits may be sent prior to sending the request from read queue 116 to memory device 106. For example, if request stream 102b is utilizing fewer than all available read credits allocated to request stream 102b, an indication of an available read credit may be sent in response to receiving a read request.

Requests of traffic 130a-n may have corresponding priority levels. For example, a request from request stream 102a may have a low latency traffic priority level, a request from request stream 102b may have a bulk priority level, and a request from request stream 102n may have a real-time priority level. In some cases, all traffic (e.g., traffic 130b) from a request stream (e.g., request stream 102b) may have a same priority level (e.g., bulk). In such cases, the request stream may be described as having that priority level. In other cases, some request streams may send requests having different priority levels. For example, a first request of traffic 130a may have a bulk priority level and a second request of traffic 130a may have a real-time priority level.

In various embodiments, credits (e.g., read credits, write credits, or both) may be assigned to request streams 102a-n based on corresponding priority levels. In some embodiments, the credits may be associated with particular priority levels. For example, request stream 102a may receive 5% of available read credits for requests having a bulk priority level and 20% of available read credits for requests having a real-time priority level.

As further described below with reference to FIGS. 3A and 3B, requests may be sent from read queue 116, write queue 118, or both, to memory device 106 based on priority levels of the requests. For example, within a particular window of time (e.g., 2 microseconds or 5 seconds), arbitration circuit 114 may identify a first number of requests as having a low-latency traffic priority level and may identify a second number of requests as having a real-time priority level. Arbitration circuit 114 may send the low-latency traffic requests to memory device 106 prior to sending the real-time requests. Accordingly, memory controller 104 may act in accordance with quality of service constraints.

Figure 2A:
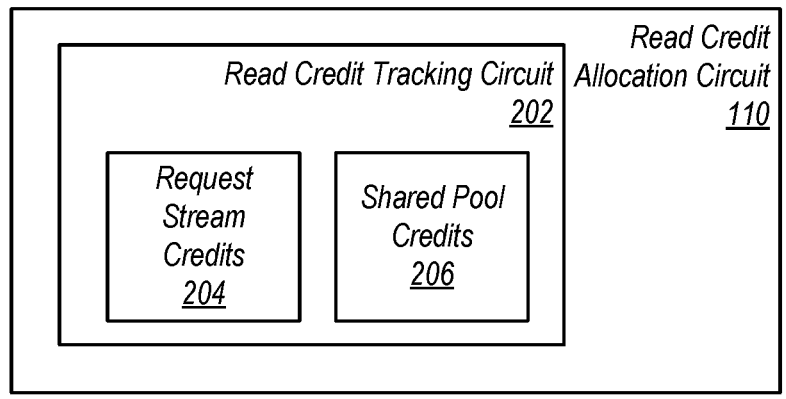
FIG. 2A is a block diagram illustrating one embodiment of an exemplary read credit allocation circuit.

Turning now to FIG. 2A, a simplified block diagram illustrating one embodiment of read credit allocation circuit 110 is shown. In the illustrated embodiment, read credit allocation circuit 110 includes read credit tracking circuit 202. Read credit tracking circuit 202 includes an indication of request stream credits 204 and an indication of shared pool credits 206. In other embodiments, read credit allocation circuit 110 may include various other circuits (e.g., communication circuits). In some embodiments, read credit allocation circuit 110 may be incorporated into arbitration circuit 114 of FIG. 1.

As discussed above, read credit allocation circuit 110 may, via read credit tracking circuit 202, track credits allocated to request streams 102a-n. For example, request stream credits 204 may list total allocated credits for request streams 102a-n, available credits for request streams 102a-n, or both. Further, in some cases, some credits may be allocated to shared pool credits 206. In response to a request (e.g., a read request or a bandwidth or credit request) from a request stream that does not have an available read credit, read credit allocation circuit may allocate an available shared credit from shared pool credits 206 to the request stream. Accordingly, the memory request management system may have flexibility to accommodate additional bandwidth requests.

As discussed above, in some embodiments, indications of available read credits may be sent prior to sending the request from read queue 116 to memory device 106. As another example, in response to determining that a shared credit from shared pool credits 206 is available, credit tracking circuit 202 may send an indication of an available read credit to the corresponding request stream and allocate the shared credit to the corresponding request stream.

In some embodiments, shared credits may be returned after a particular amount of time. In some embodiments, in response to determining that a particular request stream has more than a threshold amount of shared pool credits, read credit allocation circuit 110 may return credits to shared pool credits 206 for potential reallocation. For example, as discussed above, indications of available read credits may be provided in response to sending a read request from read queue 116 to memory device 106. However, in response to request stream 102b using more than 33% of available read credits from shared pool credits 206, read credit allocation circuit 110 may provide the read credit to shared pool credits 206, thus subjecting the read credit to an arbitration process, rather than automatically providing the read credit back to request stream 102b. The threshold amount may be based on a number of request streams, based on a specified value, based on another factor, or any combination thereof.

Figure 2B:
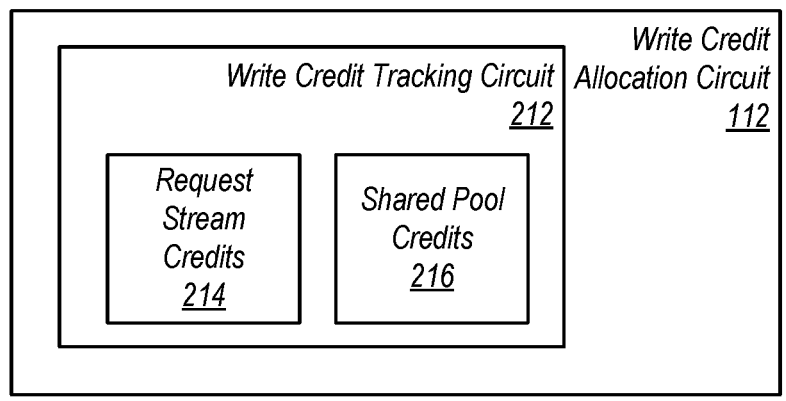
FIG. 2B is a block diagram illustrating one embodiment of an exemplary write credit allocation circuit.

Turning now to FIG. 2B, a simplified block diagram illustrating one embodiment of write credit allocation circuit 112 is shown. In the illustrated embodiment, write credit allocation circuit 112 includes write credit tracking circuit 212. Write credit tracking circuit 202 includes an indication of request stream credits 214 and an indication of shared pool credits 216. In other embodiments, write credit allocation circuit 112 may include various other circuits (e.g., communication circuits). In some embodiments, write credit allocation circuit 112 may be incorporated into arbitration circuit 114 of FIG. 1.

As discussed above, write credit allocation circuit 112 may, via write credit tracking circuit 212, track credits allocated to request streams 102a-n. For example, request stream credits 214 may list total allocated credits for request streams 102a-n, available credits for request streams 102a-n, or both. Further, in some cases, some credits may be allocated to shared pool credits 216. In response to a request (e.g., a write request or a bandwidth or credit request) from a request stream that does not have an available write credit, write credit allocation circuit may allocate an available shared credit from shared pool credits 216 to the request stream. Accordingly, the memory request management system may have flexibility to accommodate additional bandwidth requests.

In some embodiments, shared credits may be returned after a particular amount of time. In some embodiments, in response to determining that a particular request stream has more than a threshold amount of shared pool credits, write credit allocation circuit 112 may return credits to shared pool credits 216 for potential reallocation. For example, as discussed above, indications of available write credits may be provided in response to sending a write request from write queue 118 to memory device 106. However, in response to request stream 102b using more than 33% of available write credits from shared pool credits 216, write credit allocation circuit 112 may provide the write credit to shared pool credits 216, thus subjecting the write credit to an arbitration process, rather than automatically providing the write credit back to request stream 102b. The threshold amount may be based on a number of request streams, based on a specified value, based on another factor, or any combination thereof.

Figure 3A:
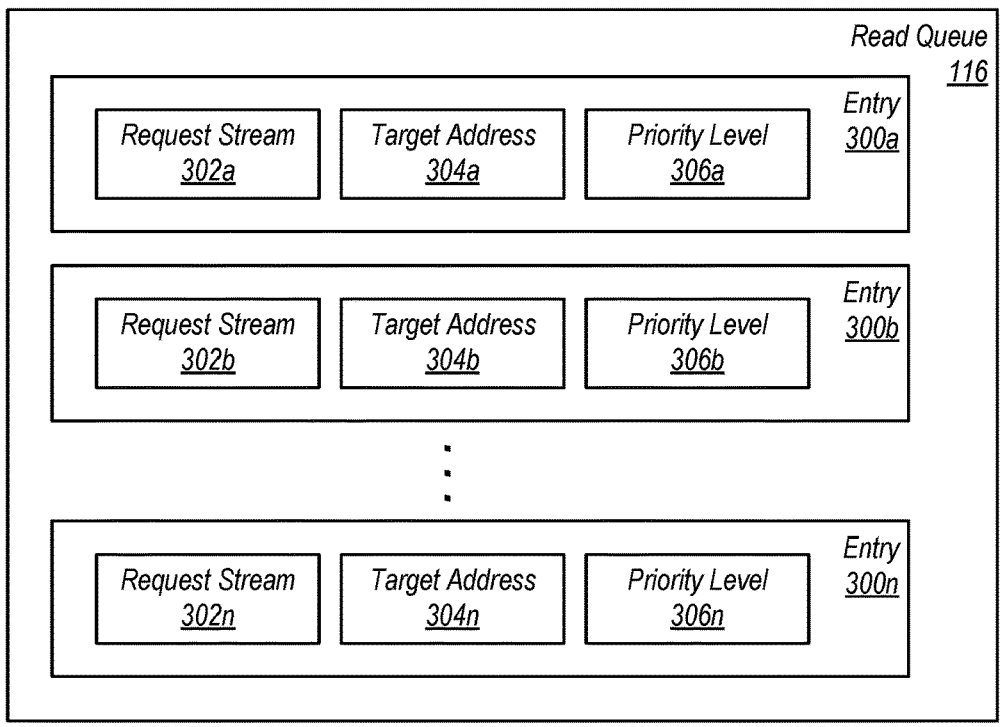
FIG. 3A is a block diagram illustrating one embodiment of an exemplary read queue.

Turning now to FIG. 3A, a simplified block diagram illustrating one embodiment of read queue 116 is shown. In the illustrated embodiment, read queue 116 includes a plurality of entries 300a-n. Entries 300a-n include respective fields configured to indicate a corresponding request stream 302a-n, target address 304a-n, and priority level 306a-n. Entries 300a-n may correspond to respective read requests received from request streams 102a-n. In various embodiments, fewer fields or additional fields may be included. For example, in some embodiments, entries 300a-n may not include fields configured to indicate priority levels 306a-n. As another example, in some embodiments, entries 300a-n may include additional fields configured to indicate ages of the respective requests. In some embodiments, read queue 116 may be a first-in-first-out (FIFO) queue based on when read queue 116 received the read request. In other embodiments, read queue 116 may have a different structure (e.g., a stack, a linked list, or another structure).

As discussed above, arbitration circuit 114 may consider a variety of factors to determine which request to send to memory device 106. In some cases, requests may be sent in a different order than the order in which they were received. For example, arbitration circuit 114 may determine to send a request from a particular request stream (e.g., request stream 102b) and thus may only look at entries that indicate, via the fields that indicate respective request streams 302a-n, the particular request stream. As another example, requests may be sent based on corresponding locations within memory device 106, which may be indicated by the fields configured to indicate respective target addresses 304a-n. As discussed above, requests may be prioritized such that page hits are more likely and page misses are less likely. Additionally, requests may be sent based on corresponding priority levels, indicated by the fields configured to indicate respective priority levels 306a-n. As discussed above, in some embodiments, within a particular window of time, requests having a particular priority level (e.g., a real-time priority level) may be sent prior to requests having a different priority level (e.g., a bulk priority level).

Figure 3B:
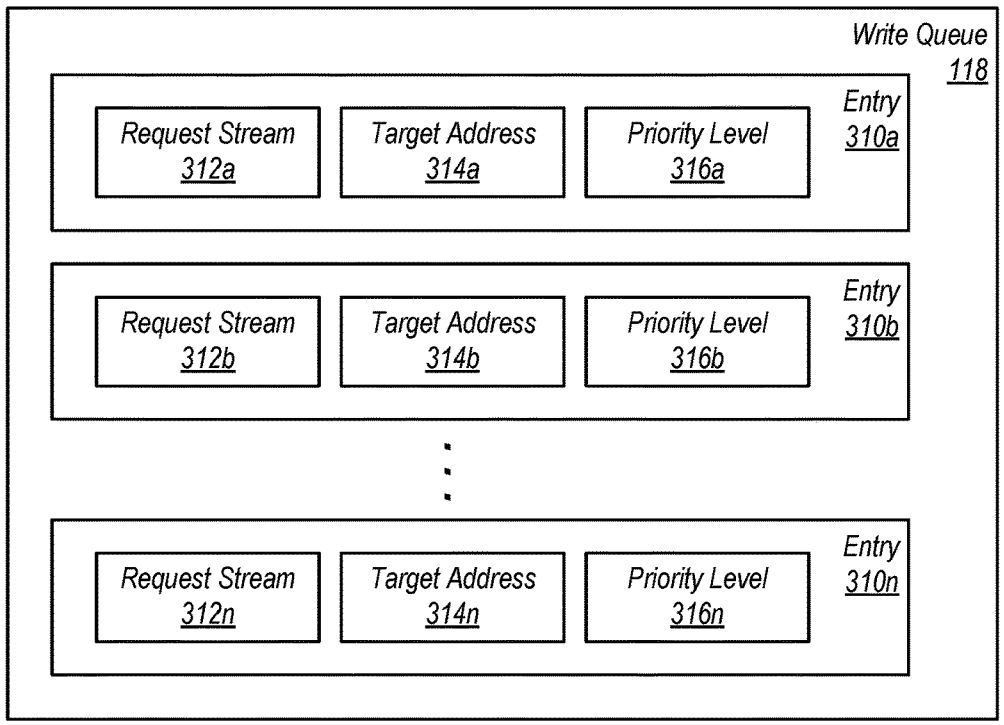
FIG. 3B is a block diagram illustrating one embodiment of an exemplary write queue.

Turning now to FIG. 3B, a simplified block diagram illustrating one embodiment of write queue 118 is shown. In the illustrated embodiment, write queue 118 includes a plurality of entries 310a-n. Entries 310a-n include respective fields configured to indicate a corresponding request stream 312a-n, target address 314a-n, and priority level 316a-n. Entries 310a-n may correspond to respective write requests received from request streams 102a-n. In various embodiments, fewer fields or additional fields may be included. For example, in some embodiments, entries 310a-n may not include fields configured to indicate priority levels 316a-n. As another example, in some embodiments, entries 310a-n may include additional fields configured to indicate ages of the respective requests. In some embodiments, write queue 118 may be a first-in-first-out (FIFO) queue based on when write queue 118 received the write request. In other embodiments, write queue 118 may have a different structure (e.g., a stack, a linked list, or another structure).

As discussed above, arbitration circuit 114 may consider a variety of factors to determine which request to send to memory device 106. In some cases, requests may be sent in a different order than the order in which they were received. For example, arbitration circuit 114 may determine to send a request from a particular request stream (e.g., request stream 102b) and thus may only look at entries that indicate, via the fields that indicate respective request streams 312a-n, the particular request stream. As another example, requests may be sent based on corresponding locations within memory device 106, which may be indicated by the fields configured to indicate respective target addresses 314a-n. As discussed above, requests may be prioritized such that page hits are more likely and page misses are less likely. Additionally, requests may be sent based on corresponding priority levels, indicated by the fields configured to indicate respective priority levels 316a-n. As discussed above, in some embodiments, within a particular window of time, requests having a particular priority level (e.g., a real-time priority level) may be sent prior to requests having a different priority level (e.g., a bulk priority level).

Figure 4:
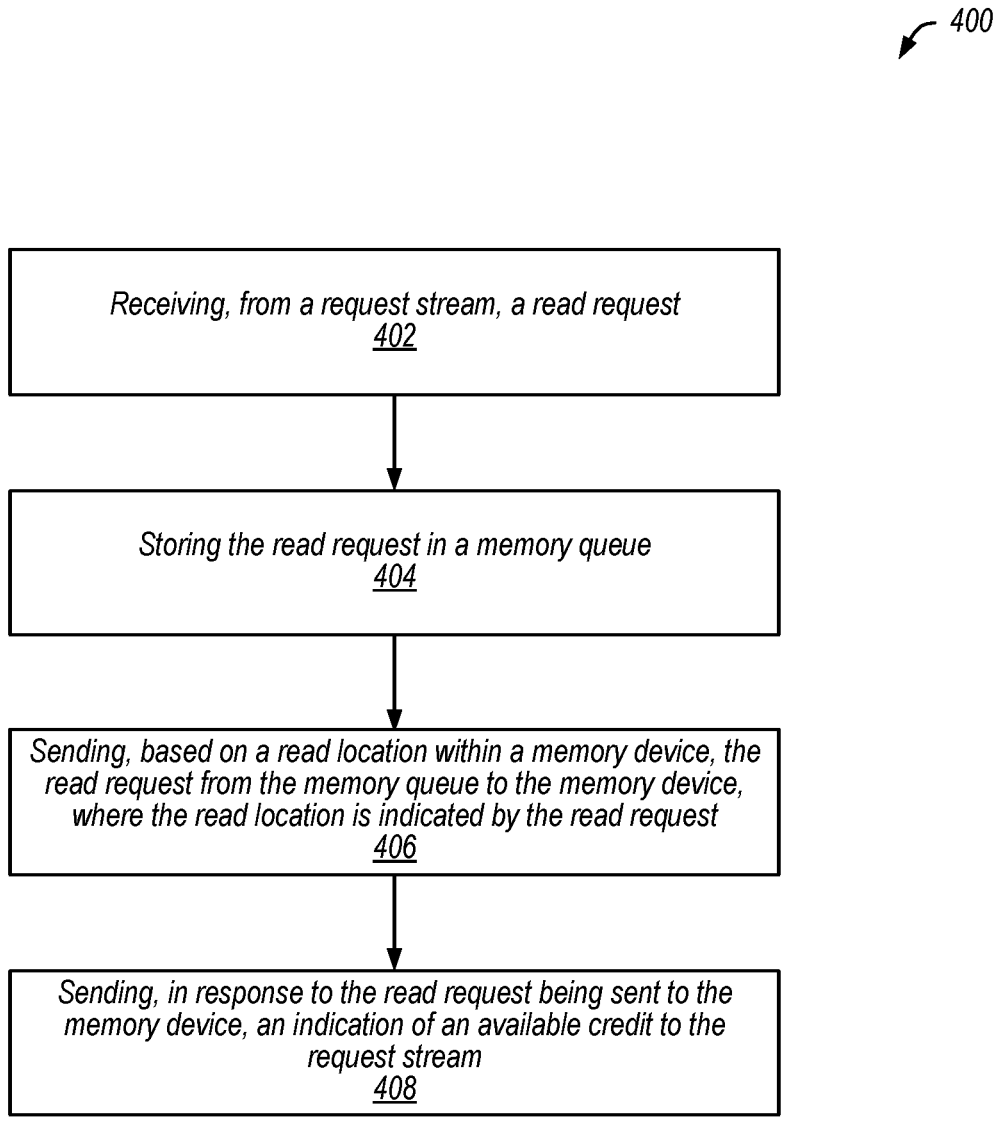
FIG. 4 is a flow diagram illustrating one embodiment of a method of processing a read request.

Referring now to FIG. 4, a flow diagram of a method 400 of processing a read request is depicted. In some embodiments, method 400 may be initiated or performed by one or more processors in response to one or more instructions stored by a computer-readable storage medium. Although a read request is specifically described, in other embodiments, write requests may additionally or alternatively be processed as described above.

At 402, method 400 includes receiving, from a request stream, a read request. For example, memory controller 104 of FIG. 1 may receive a read request from request stream 102b.

At 404, method 400 includes storing the read request in a memory queue. For example, the read request may be stored in read queue 116.

At 406, method 400 includes sending, based on a read location within a memory device, the read request from the memory queue to the memory device. The read location may be indicated by the read request. For example, memory controller 104 may send the read request from read queue 116 to memory device 106 as read request 132. The read request may indicate a read location within memory device 106.

At 408, method 400 includes sending, in response to the read request being sent to the memory device, an indication of an available credit to the request stream. For example, memory controller 104 may send, in response to sending read request 132, an indication of an available read credit to request stream 102b via traffic 130b. Accordingly, a method of processing a read request is depicted.

As discussed above, in some embodiments, instead of waiting until the read request is sent to the memory device, an indication of an available read credit may be sent in response to receiving the read request or to storing the read request in the read queue (e.g., because a read credit allocated to the request stream is available or because a read credit from a shared pool of credits is available).

Figure 5:
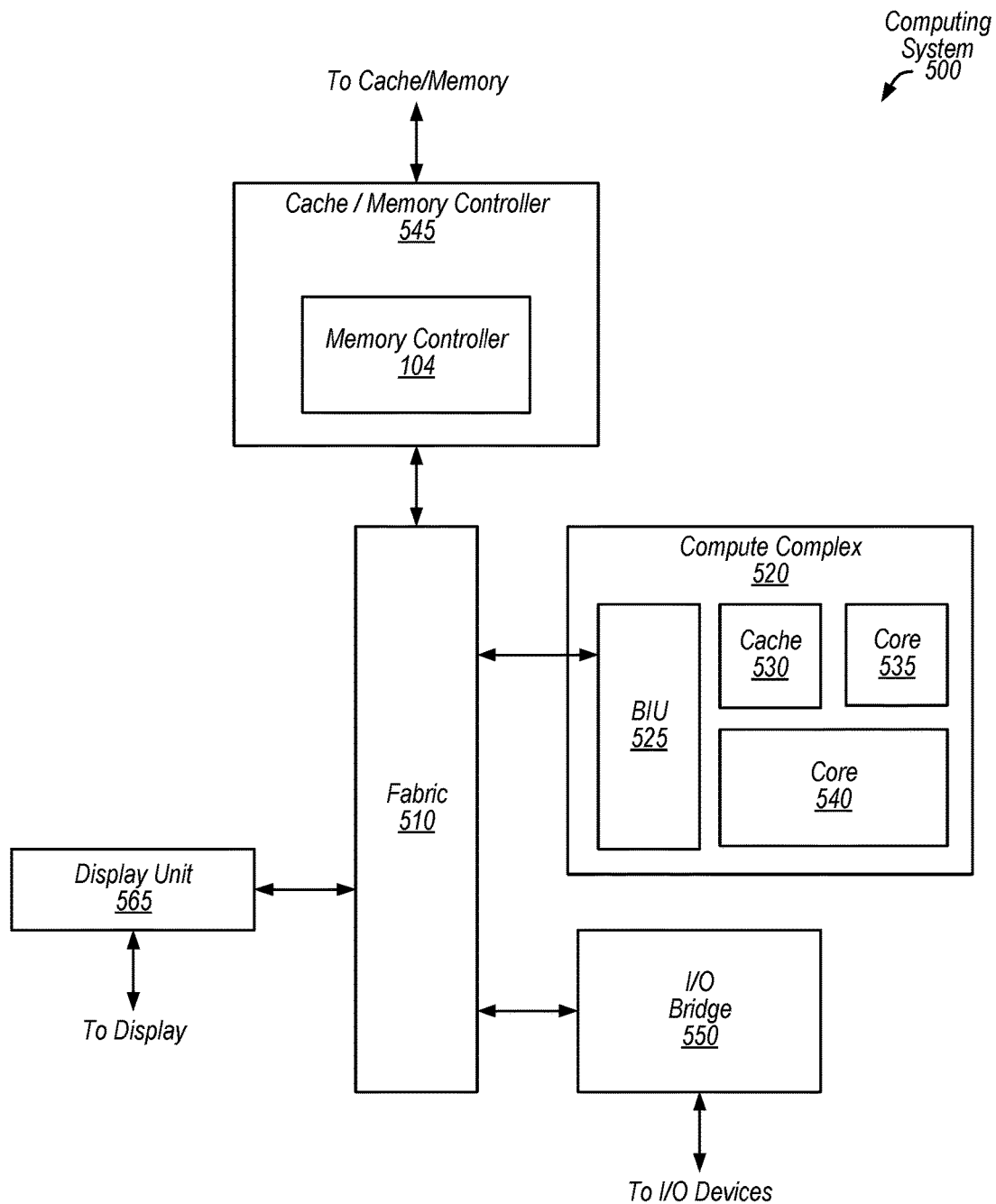
FIG. 5 is block diagram illustrating an embodiment of a computing system that includes at least a portion of a memory request management system.

Turning next to FIG. 5, a block diagram illustrating an exemplary embodiment of a computing system 500 that includes at least a portion of a clock pulse generation circuit. The computing system 500 includes memory controller 104 of FIG. 1. In some embodiments, memory controller 104 includes one or more of the circuits described above with reference to FIG. 1, including any variations or modifications described previously with reference to FIGS. 1-4. Additionally, in some embodiments, computing system 500 further includes other elements described above, such as request streams 102a-n, memory device 106, or both. In some embodiments, some or all elements of the computing system 500 may be included within a system on a chip (SoC). In some embodiments, computing system 500 is included in a mobile device. Accordingly, in at least some embodiments, area and power consumption of the computing system 500 may be important design considerations. In the illustrated embodiment, the computing system 500 includes fabric 510, compute complex 520, input/output (I/O) bridge 550, cache/memory controller 545, and display unit 565. Although the computing system 500 illustrates memory controller 104 as being located within cache/memory controller 545, in other embodiments, cache/memory controller 545 may be memory controller 104, computing system 500 may include memory controller 104 in other locations (e.g., connected to or included in compute complex 520) or may include multiple instances of memory controller 104. The memory controllers 104 may correspond to different embodiments or to the same embodiment.

Fabric 510 may include various interconnects, buses, MUXes, controllers, etc., and may be configured to facilitate communication between various elements of computing system 500. In some embodiments, portions of fabric 510 are configured to implement various different communication protocols. In other embodiments, fabric 510 implements a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In some embodiments, cache 530, cores 535 and 540, other portions of compute complex 520, or a combination thereof may be hardware resources. In various embodiments, compute complex 520 includes various numbers of cores and/or caches. For example, compute complex 520 may include 1, 2, or 4 processor cores, or any other suitable number. In some embodiments, cores 535 and/or 540 include internal instruction and/or data caches. In some embodiments, a coherency unit (not shown) in fabric 510, cache 530, or elsewhere in computing system 500 is configured to maintain coherency between various caches of computing system 500. BIU 525 may be configured to manage communication between compute complex 520 and other elements of computing system 500. Processor cores such as cores 535 and 540 may be configured to execute instructions of a particular instruction set architecture (ISA), which may include operating system instructions and user application instructions.

In the illustrated embodiment, cache/memory controller 545 includes memory controller 104. Cache/memory controller 545 may be configured to manage transfer of data between fabric 510 and one or more caches and/or memories (e.g., non-transitory computer readable mediums). For example, cache/memory controller 545 may be coupled to an L3 cache, which may, in turn, be coupled to a system memory. In other embodiments, cache/memory controller 545 is directly coupled to a memory. In some embodiments, the cache/memory controller 545 includes one or more internal caches. In some embodiments, the cache/memory controller 545 may include or be coupled to one or more caches and/or memories that include instructions that, when executed by one or more processors (e.g., compute complex 520), cause the processor, processors, or cores to initiate or perform some or all of the processes described above with reference to FIGS. 1-4 or below with reference to FIG. 6. In some embodiments, one or more portions of the caches/memories may correspond to hardware resources.

As used herein, the term "coupled to" may indicate one or more connections between elements, and a coupling may include intervening elements. For example, in FIG. 5, display unit 565 may be described as "coupled to" compute complex 520 through fabric 510. In contrast, in the illustrated embodiment of FIG. 5, display unit 565 is "directly coupled" to fabric 510 because there are no intervening elements.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display). In some embodiments, one or more portions of display unit 565 may be hardware resources.

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 500 via I/O bridge 550. In some embodiments, memory controller 104 may be coupled to computing system 500 via I/O bridge 550. In some embodiments, one or more devices coupled to I/O bridge 550 may be hardware resources.

Figure 6:
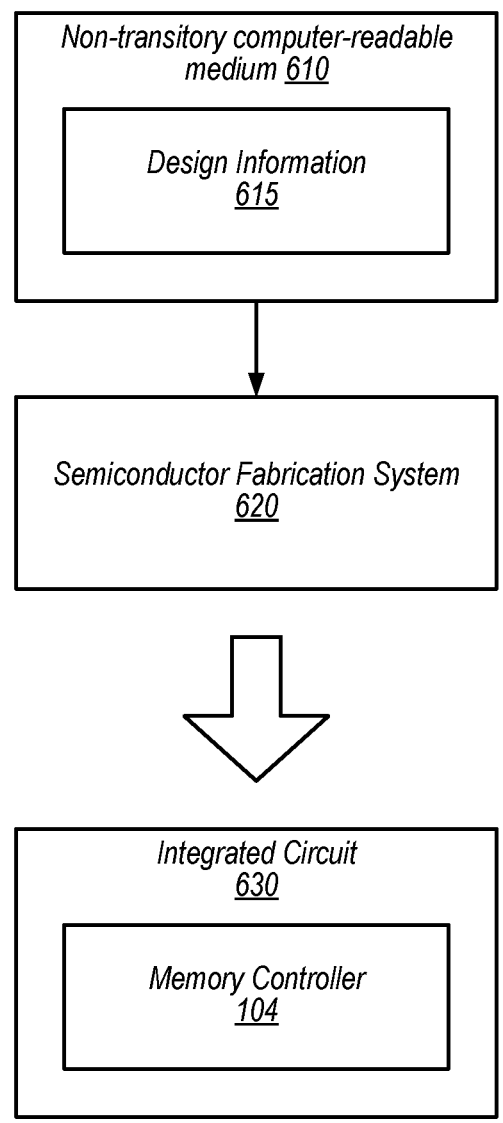
FIG. 6 is a block diagram illustrating one embodiment of a process of fabricating at least a portion of a processing circuit that includes a memory controller.

FIG. 6 is a block diagram illustrating a process of fabricating at least a portion of a memory request management system. FIG. 6 includes a non-transitory computer-readable medium 610 and a semiconductor fabrication system 620. Non-transitory computer-readable medium 610 includes design information 615. FIG. 6 also illustrates a resulting fabricated integrated circuit 630. In the illustrated embodiment, integrated circuit 630 includes memory controller 104 of FIG. 1. However, in other embodiments, integrated circuit 630 may only include one or more portions of memory controller 104 (e.g., arbitration circuit 114). In some embodiments, integrated circuit 630 may include different embodiments of memory controller 104. In some embodiments, integrated circuit may additionally or alternatively include other circuits described above, such as memory device 106 or request streams 102*a-n*. In the illustrated embodiment, semiconductor fabrication system 620 is configured to process design information 615 stored on non-transitory computer-readable medium 610 and fabricate integrated circuit 630.

Non-transitory computer-readable medium 610 may include any of various appropriate types of memory devices or storage devices. For example, non-transitory computer-readable medium 610 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 610 may include two or more memory mediums, which may reside in different locations (e.g., in different computer systems that are connected over a network).

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries, which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit (e.g., integrated circuit 630). For example, design information 615 may specify circuit elements to be fabricated but not their physical layout. In this case, design information 615 may be combined with layout information to fabricate the specified integrated circuit.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements described with reference to FIGS. 1-5. Further, integrated circuit 630 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 630 is performed. Design information 615 may be generated using one or more computer systems and stored in non-transitory computer-readable medium 610. The method may conclude when design information 615 is sent to semiconductor fabrication system 620 or prior to design information 615 being sent to semiconductor fabrication system 620. Accordingly, in some embodiments, the method may not include actions performed by semiconductor fabrication system 620. Design information 615 may be sent to semiconductor fabrication system 620 in a variety of ways. For example, design information 615 may be transmitted (e.g., via a transmission medium such as the Internet) from non-transitory computer-readable medium 610 to semiconductor fabrication system 620 (e.g., directly or indirectly). As another example, non-transitory computer-readable medium 610 may be sent to semiconductor fabrication system 620. In response to the method of initiating fabrication, semiconductor fabrication system 620 may fabricate integrated circuit 630 as discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a memory device;
a memory controller, comprising:
a read queue configured to store read requests from a plurality of request streams;
a write queue configured to store write requests from the plurality of request streams;
an arbitration circuit configured to send, based on locations of corresponding addresses within the memory device, read requests from the read queue to the memory device and write requests from the write queue to the memory device;
a read credit allocation circuit configured, in response to a read request from a particular request stream being sent from the read queue to the memory device, to send an indication of an available read credit to the particular request stream, wherein the read queue is configured to receive a read request from the particular request stream in response to the indication of the available read credit; and
a write credit allocation circuit configured, in response to the write queue storing a write request from the particular request stream, to send an indication of an available write credit to the particular request stream, wherein the write queue is configured to receive a write request from the particular request stream in response to the indication of the available write credit.

2. The apparatus of claim 1, wherein the arbitration circuit is further configured to identify a first group of read requests as having a first priority level and a second group of read requests as having a second priority level, wherein the first priority level is higher priority than the second priority level.

3. The apparatus of claim 2, wherein the arbitration circuit is further configured to send the read requests from the read queue based on priority levels of the read requests.

4. The apparatus of claim 2, wherein the first priority level corresponds to low latency traffic, and wherein the second priority level corresponds to real-time traffic.

5. The apparatus of claim 2, wherein the first priority level corresponds to low latency traffic, and wherein the second priority level corresponds to bulk traffic.

6. The apparatus of claim 2, wherein a first request stream of the plurality of request streams has the first priority level, and wherein a second request stream of the plurality of request streams has the second priority level.

7. The apparatus of claim 1, wherein the read credit allocation circuit is further configured to allocate a number of credits to the particular request stream based on a requested bandwidth of the particular request stream and based on a priority level of the particular request stream.

8. The apparatus of claim 7, wherein the particular request stream is associated with multiple priority levels, and wherein the read credit allocation circuit is further configured to indicate to the particular request stream that a first subset of the number of credits are to be associated with requests having a first priority level and that a second subset of the number of credits are to be associated with requests having a second priority level.

9. The apparatus of claim 1, wherein the read credit allocation circuit is further configured to send the indication of the available read credit to the particular request stream in response to determining, prior to the read request being sent to the memory device, that no read credits corresponding to the particular request stream are available.

10. The apparatus of claim 9, wherein the read credit allocation circuit is further configured, in response to the read request from the particular request stream, to:
determine whether a read credit corresponding to the particular request stream is available; and
in response to determining that the read credit corresponding to the particular request stream is available, in response to the memory controller receiving the read request, and prior to the read request being sent from the read queue to the memory device, send the indication of the available read credit to the particular request stream.

11. A method, comprising:
receiving, at a memory controller from a request stream of a plurality of request streams, a read request;
storing, by the memory controller, the read request in a memory queue;
sending, by an arbitration circuit of the memory controller, based on a read location within a memory device, the read request from the memory queue to the memory device, wherein the read location is indicated by the read request; and
sending, by a credit allocation circuit of the memory controller, in response to the read request being sent to the memory device, an indication of an available credit to the request stream.

12. The method of claim 11, further comprising:
receiving, subsequent to receiving the read request, a second read request from the request stream, wherein the second read request indicates a different read location; and
sending, prior to sending the read request to the memory device, based on the read location and the different read location, the second read request from the memory queue to the memory device.

13. The method of claim 12, wherein sending the second read request comprises:
determining that the read location is in a same portion of the memory device as a portion indicated by a previous request sent from the memory queue to the memory device;
determining that the read location is in a different page of the memory device than a page indicated by the previous request; and
determining that the different read location is in a different portion of the memory device as the portion indicated by the previous request.

14. The method of claim 12, wherein sending the second read request comprises:
determining that the read location is in a different portion of the memory device as a portion indicated by a previous request sent from the memory queue to the memory device;
determining that the different read location is in the same portion of the memory device as the portion indicated by the previous request sent from the memory queue to the memory device; and
determining that the different read location is in a same page of the memory device as a page indicated by the previous request.

15. The method of claim 11, wherein the memory device is dynamic random-access memory (DRAM) device.

16. A non-transitory computer readable storage medium having stored thereon design information that specifies a circuit design in a format recognized by a fabrication system that is configured to use the design information to fabricate a hardware integrated circuit that comprises:
a memory device;
a memory controller, comprising:
a read queue configured to store read requests from a plurality of request streams;
a write queue configured to store write requests from the plurality of request streams;
an arbitration circuit configured to send read requests from the read queue to the memory device and write requests from the write queue to the memory device;
a read credit allocation circuit configured, in response to a read request from a particular request stream being sent from the read queue to the memory device, to send an indication of an available read credit to the particular request stream, wherein the read queue is configured to receive a read request from the particular request stream in response to the indication of the available read credit; and
a write credit allocation circuit configured, in response to the write queue storing a write request from the particular request stream, to send an indication of an available write credit to the particular request stream, wherein the write queue is configured to receive a write request from the particular request stream in response to the indication of the available write credit.

17. The non-transitory computer readable storage medium of claim 16, wherein the read credit allocation circuit is further configured to send the indication of the available read credit to the particular request stream in response to determining, prior to the read request being sent to the memory device, that no read credits corresponding to a shared pool of read credits are available.

18. The non-transitory computer readable storage medium of claim 17, wherein the read credit allocation circuit is further configured to:
determine whether a read credit corresponding to the shared pool is available; and
in response to determining that the read credit corresponding to the shared pool is available, in response to the memory controller receiving the read request, and prior to the read request being sent from the read queue to the memory device, send the indication of the available read credit to the particular request stream.

19. The non-transitory computer readable storage medium of claim 18, wherein the read credit allocation circuit is further configured to:
in response to the read request being sent to the memory device, determine whether a threshold number of read credits corresponding to the shared pool have been sent to the particular request stream, wherein the read request corresponds to a read credit corresponding to the shared pool; and
in response to determining that the threshold number of read credits have been sent to the particular request stream, provide a read credit to the shared pool.

20. The non-transitory computer readable storage medium of claim 16, wherein the write credit allocation circuit is further configured to allocate a number of unallocated credits to a shared pool of write credits.

* * * * *